United States Patent [19]

Waterman et al.

[11] 4,094,039

[45] June 13, 1978

[54] WINDSHIELD WIPER BAYONET CLIP WITH DOUBLE LATCH

[75] Inventors: Peter G. Waterman, Burlington; Donald Earl Emmons, Brampton, both of Canada

[73] Assignee: Tridon Limited, Burlington, Canada

[21] Appl. No.: 765,697

[22] Filed: Feb. 4, 1977

Related U.S. Application Data

[63] Continuation-in-part of Ser. No. 678,494, Apr. 20, 1976, abandoned.

[51] Int. Cl.² .............................................. B60S 1/42
[52] U.S. Cl. ................................................. 15/250.32
[58] Field of Search ........... 15/250.32, 250.33–250.42; 403/329

[56] References Cited

U.S. PATENT DOCUMENTS

| 3,593,362 | 7/1971 | Arman | 15/250.32 |
| 3,768,113 | 10/1973 | Kolb | 15/250.32 |
| 3,900,917 | 8/1975 | Baut et al. | 15/250.32 |

FOREIGN PATENT DOCUMENTS

| 1,088,376 | 9/1960 | Germany | 15/250.32 |
| 1,186,457 | 4/1970 | United Kingdom | 15/250.32 |

*Primary Examiner*—Daniel Blum

[57] ABSTRACT

A connector clip for use in connecting a bayonet type windshield wiper arm to the superstructure of a windshield wiper assembly has a main body which includes means for connecting the clip body to the windshield wiper superstructure and a sleeve which is adapted to operatively engage and retain the windshield wiper bayonet arm. This sleeve has a top wall and an axially extended recess formed therein below the top wall for receiving the bayonet arm in a close fit. A spring mounting wall is included in the clip body adjacent the recess and has a slot formed therein in which a leaf spring element is mounted. The spring is located along the recess below the inserted bayonet arm and has a tab formed thereon for engagement in a recess on the lower side of the bayonet arm to form a double latch. The spring also includes means for cooperating with the spring mounting wall to prevent removal of the spring from the clip body.

8 Claims, 8 Drawing Figures

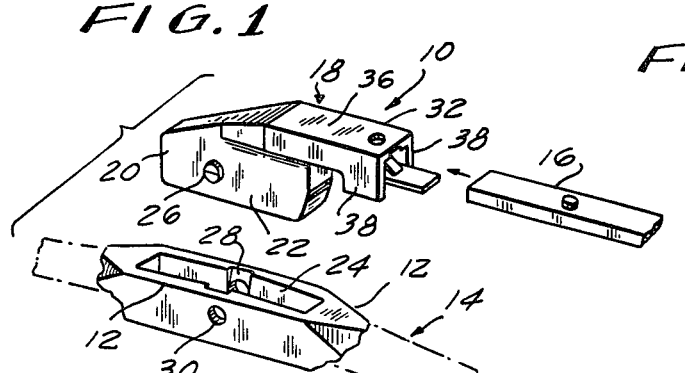
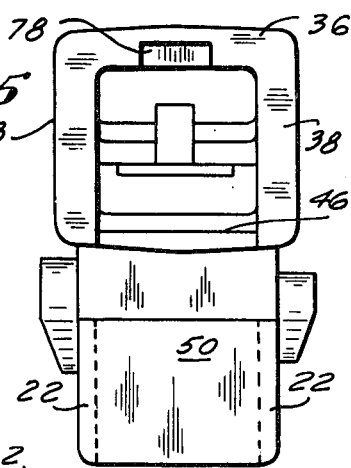
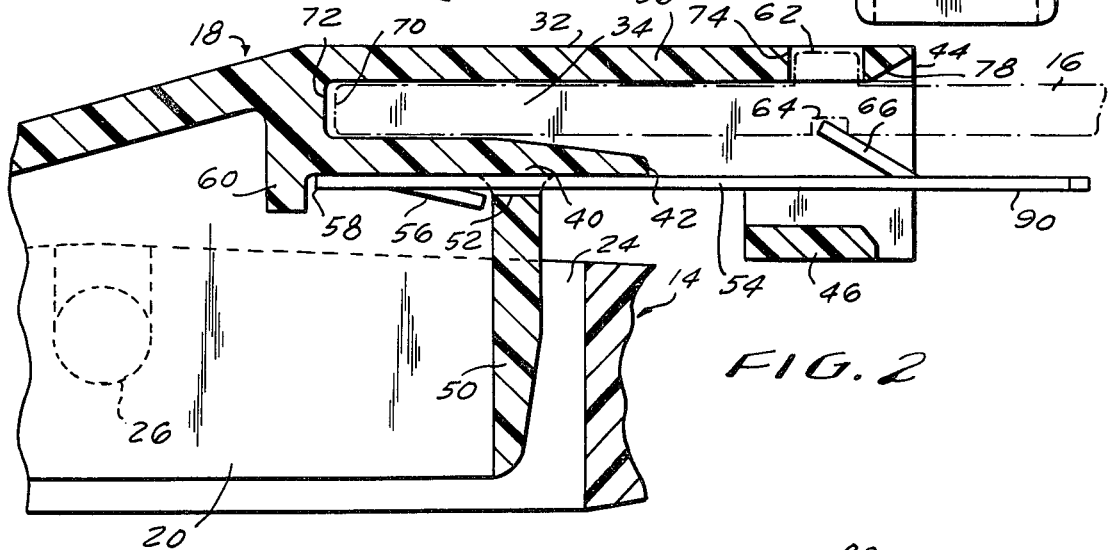
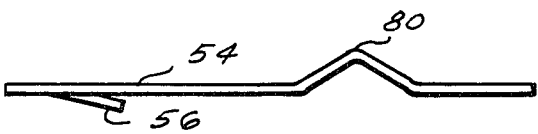
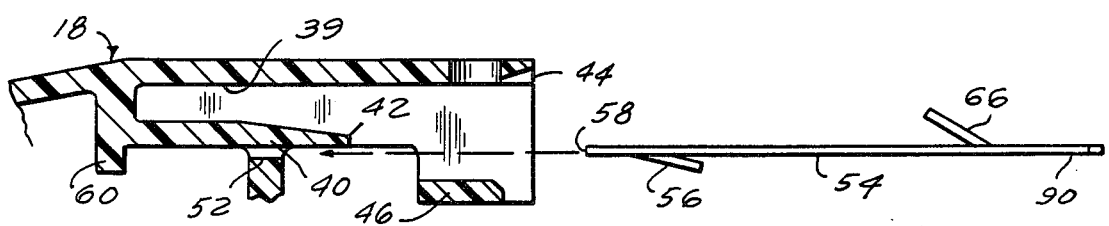
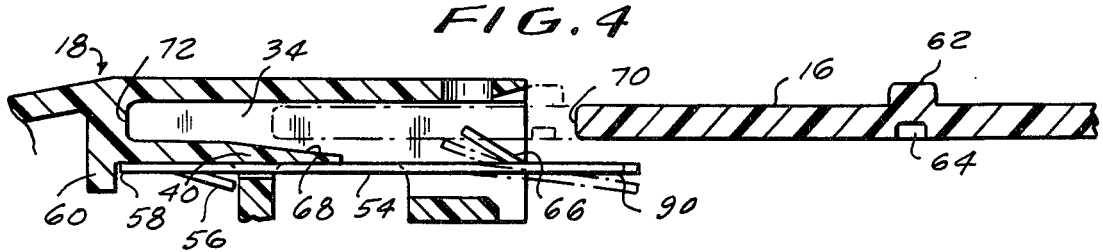

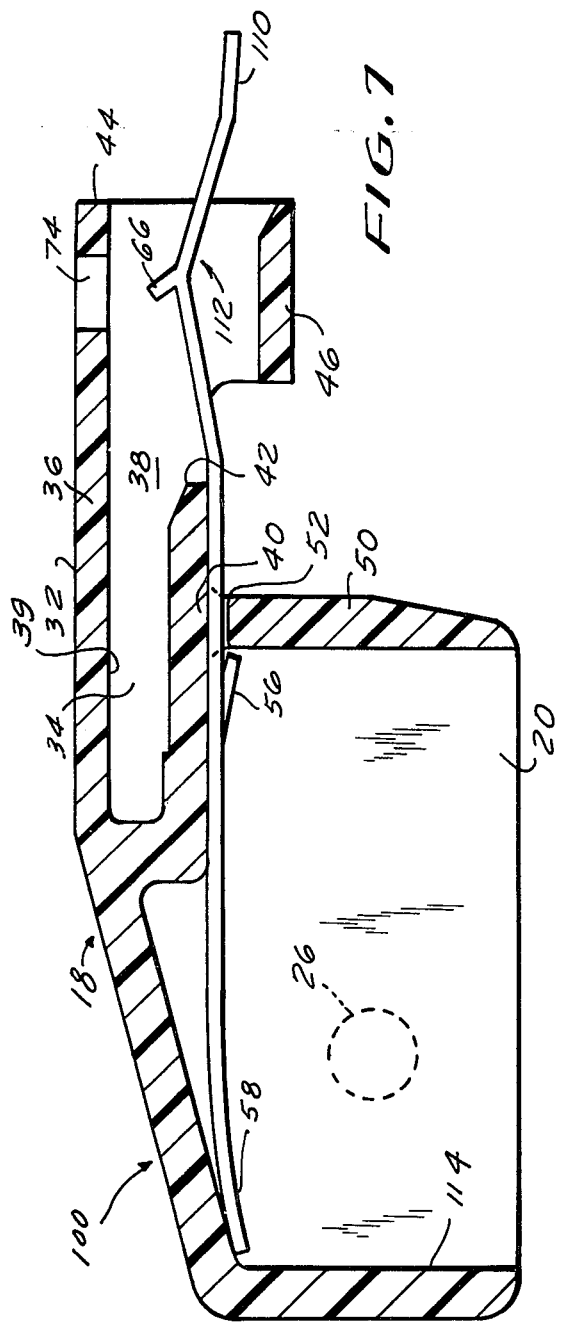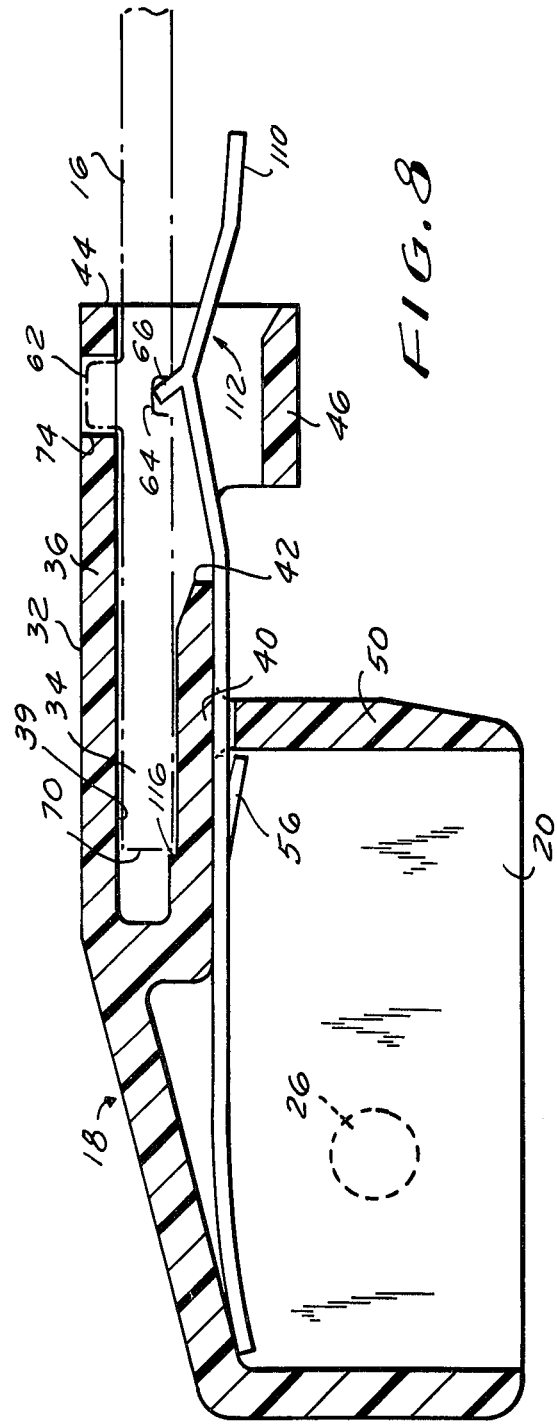

WINDSHIELD WIPER BAYONET CLIP WITH DOUBLE LATCH

This application is a continuation-in-part of U.S. patent application Ser. No. 678,494 filed Apr. 20, 1976, now abandoned.

The present invention relates to windshield wiper connecting clips, and more particularly to a connecting clip which is adapted to be used with windshield wiper arms of the bayonet type.

There are numerous types of connecting clips used to secure windshield wiper assembly superstructures to the wiper arm of a motor vehicle's windshield wiper system. Such clips take a variety of shapes but perhaps the most common are those adapted to receive the ends of a bayonet type arm. These clips typically have a recess or channel which is adapted to receive and surround the end of the arm, with the clip having an aperture adapted to receive a stud or locking button formed on the bayonet arm.

Several different types of such bayonet clip arrangements are provided with spring elements which serve to hold the bayonet arm in position within the clip. For example, in U.S. Pat. No. 2,915,770 to Scinta, a clip structure is disclosed which uses a spring element having a bend or protuberance formed therein to bias the bayonet arm upwardly in the clip so that its locking lug is engaged within the opening of the clip. The spring element therein is bent in a relatively complex manner and would be difficult to manufacture and assemble with the clip arrangement.

Variations of the Scinta type clips are shown in U.S. Pat. Nos. 3,135,983, 3,593,362 and 3,900,917 to O'Shei, Arman and Baut et al., respectively. In these patents spring elements are provided in the clip body which include integral tabs or teeth that are biased by the spring into engagement with recesses or holes in the bayonet arm, thereby to prevent movement of the arm in the clip. Again, such spring elements are relatively complex and they are difficult to assemble in their clip structures.

A similar spring clip arrangement is shown in U.S. Pat. No. 2,861,290 to Hoyler in which a relatively straight spring is used having a protuberance which is biased by the spring into a recess of the bayonet arm. However, in order to lock the spring in the clip element a separate forming or pressing operation is required; or else the spring must be cast directly in the clip when the clip is formed. These additional assembly steps are both difficult to perform accurately and represent an additional manufacturing expense.

Yet another spring clip arrangement is shown in U.S. Pat. No. 3,056,160 to Oishei et al. in which a biasing spring is used to bias the bayonet arm upwardly in the clip to engage the locking button of the clip in an opening in the clip. The spring also includes a tab arrangement to form a safety latch to prevent inadvertent disengagement of the bayonet arm and clip.

It is an object of the present invention to provide a connecting clip for windshield wiper assemblies which includes a spring locking element that is relatively simple to manufacture and yet is durable in use.

A further object of the present invention is to provide a connecting clip which is relatively easy to connect and remove from a windshield wiper bayonet arm, and yet which will firmly lock the arm to the wiper blade superstructure when in use.

A further object of the present invention is to provide a windshield wiper connecting clip of the character described which is relatively inexpensive to manufacture and durable in construction.

In accordance with an aspect of the present invention a connector clip for connecting a bayonet type windshield wiper arm to the superstructure of a windshield wiper assembly includes a main body portion and an extension portion that has means for securing the clip to a wiper assembly superstructure. The main body portion of the clip also includes an elongated sleeve which extends to a free end and has a hollow recess formed therein for receiving, through its free end, the end of the bayonet arm of a windshield wiper arm. The sleeve is defined by top, side and bottom walls which surround the recess and provide a pocket that receives the free end of the bayonet arm. The bottom wall is shorter than the top wall and is spaced from the free end of the sleeve so that the recess is open along its bottom side between the bottom wall and the free end of the sleeve.

A support wall having an elongated slot formed therein is included in the clip body and extends generally perpendicularly from and below the bottom wall of the sleeve. An abutment wall is located in spaced relation to the support wall but is positioned further from the free end of the sleeve than the support wall. Finally, a flat leaf spring, having one end inserted through the slot of the support wall to a position adjacent the abutment wall, includes an integral resilient tab inclined downwardly away from the one end of the spring so that the spring and tab can be inserted through the slot until movement of the spring is stopped by the abutment wall. This tab is located to be between the abutment wall and the support wall when movement of the spring is stopped by the abutment wall, thereby to prevent withdrawal of the spring from the clip body upon engagement of the tab with the support wall. By this arrangement the leaf spring extends below and beyond the bottom wall of the sleeve towards the free end of the sleeve adjacent the recess. That portion of the spring adjacent the recess includes means to enter a locking recess formed in the lower surface of the bayonet arm thereby to prevent inadvertent removal of the arm from the clip.

The above, and other objects, features and advantages of this invention, will be apparent in the following detailed description of an illustrative embodiment thereof, which is to be read in connection with the accompanying drawings, wherein:

FIG. 1 is an exploded perspective view of a connecting clip formed in accordance with the present invention, showing the clip in association with a wiper arm and windshield superstructure;

FIG. 2 is an enlarged sectional view, with parts broken away, of the connector clip illustrated in FIG. 1;

FIG. 3 is a partial sectional view similar to FIG. 2, showing the manner in which the spring element of the clip is inserted in the clip body;

FIG. 4 is a sectional view similar to FIG. 3 showing, in dotted lines, the movement of the spring upon insertion of the bayonet arm into the clip assembly;

FIG. 5 is a rear end view of the bayonet clip illustrated in FIG. 2;

FIG. 6 is a side view of another embodiment of a spring structure for use in the present invention;

FIG. 7 is a sectional view, similar to FIG. 2, showing another embodiment of a connector clip construction in accordance with the present invention; and FIG. 8 is a sectional view showing, in phantom lines, a windshield wiper assembly bayonet arm inserted in the connecting clip of FIG. 7.

Referring now to the drawing in detail and initially to FIG. 1 thereof, a connecting clip 10, constructed in accordance with the present invention, is adapted to be secured to the superstructure 12 of a windshield wiper assembly 14, while simultaneously being connected to the bayonet arm 16 of a motor vehicle's windshield wiper mechanism.

The connecting clip has a main body portion 18 and an extension portion 20 which serves to connect the clip to superstructure 12. Extension 20 consists of a pair of spaced flange members 22 which are dimensioned to be received within the generally rectangular opening 24 in superstructure 12. Each of the extension members 22 has a locking button 26 formed thereon which, during the insertion operation into the superstructure assembly, are guided by ramp sections 28 in superstructure 12 into locking engagement with the openings 30. Since the entire clip structure is formed of a molded plastic material, the extensions 22 are slightly resilient and thus are readily inserted within the openings 24. It is to be understood that extension 20 can take other convenient forms, i.e. the extension could be a solid one piece member or the flange could overlie the superstructure with pins 26 on the interior of the flanges.

Connecting clip 10 includes an integral extension or sleeve portion 32 which has an elongated opening or recess 34 formed therein that is adapted to receive the free end of bayonet arm 16. Recess 34 is defined by the top wall 36, side walls 38 and bottom wall 40 of the sleeve 32. These walls form a pocket 39 which conforms closely in shape to the free end of the bayonet arm so that the clip is held on the arm simply by the engagement of the bayonet arm in pocket 39.

As seen in FIG. 2, bottom wall 40 is somewhat shorter than top wall 36 of sleeve 32 so that its end 42 terminates inwardly of the end 44 of the top and side walls 36, 38. In this manner recess 34 is open along its bottom side between the rear end 42 of the bottom wall and the ends 44 of the side walls 38. For stability and rigidity in the side walls a brace wall 46 can be provided between side walls 38, adjacent the ends 44 thereof, but this brace wall is spaced substantially below the level of wall 40, as seen in FIG. 2.

Clip body 18 also includes a spring support wall 50 extending between the legs 22 of extension 20. This wall is located inwardly of the end 42 of bottom wall 40 and has a slot 52 formed therein through which a leaf spring element 54 is inserted. The rear end portion 42 of bottom wall 40 overlies spring 54 and holds the spring away from top wall 36. Leaf spring 54 is formed from a resilient metal or plastic material and has an integral tab element 56 formed therein. In the embodiment of the invention where spring 54 is formed of metal, tab 56 can simply be a knocked out section of the spring, which inclines downwardly (with respect to the clip) towards the end 44 of the clip body. Where the spring is formed of plastic the tab is simply molded with the spring.

Resilient tab 56 is compressed upon insertion of the end 58 of the spring through slot 52 so as to pass through the slot into position at the left of wall 50, as seen in FIG. 2. The insertion movement of the spring 54 is limited by an abutment wall 60 which is also integrally formed with clip body 10. This wall is further from the end 44 of top wall 36 than wall 50, but is spaced generally parallel to wall 50. The location of tab 56 on spring 54 is selected such that when movement of spring element 54 into the clip is stopped by engagement of spring end 58 with wall 60, the tab will be to the left of the wall 50. In this position the downwardly inclined tab will prevent removal of the spring towards the right in FIG. 2. Thus, the spring is effectively held in a relatively fixed position in the clip. The spring is relatively simple to insert in the clip by a manual pushing operation and no further forming operations on the clip are required.

The clip of the present invention is used with a bayonet arm of the type having a locking button 62 formed on its upper surface and a recess 64 formed on its lower surface. The spring 54 is provided with an additional integral resilient tab member 66 which extends upwardly and inwardly of the clip body, as illustrated in FIG. 2 and 3. Tab element 66 is located such that when spring 54 is properly located within the clip body, and when the free end of the bayonet arm is located in pocket 39 with locking button 62 in recess 64 the tab 66 will enter recess 64, thereby to prevent inadvertent outward movement of the bayonet arm should button 62 become disengaged with recess 74.

It will be appreciated that because of the inclination of tab 66, when bayonet arm 16 is inserted into the elongated recess 34 of the clip body, spring 54 will be flexed slightly, out of the way, as illustrated in FIG. 4, to permit entry of the bayonet arm. Preferably, the bottom wall 40 of the clip arm has an inclined section 68 which serves to guide the free end 70 of the bayonet arm properly into the closed end or pocket 39 of recess 34. When movement of the arm into the recess is stopped by engagement of end 70 of the arm with front wall 72 of pocket 39, locking button 62 on the arm enters opening 74 provided in top wall 36 of the clip body. In this connection, it is noted that in order to aid in the insertion of the bayonet arm into recess 34, top wall 36 of the sleeve 32 can have a guide ramp 78 formed therein for guiding the locking button 62 into recess 74. The clip is thus firmly held on the bayonet arm with the locking button 62 held in recess 74 by the close fitting relation of the bayonet arm in the pocket 39. As a result the clip is securely held in place on the bayonet arm.

When the clip is mounted on the arm in this manner, tab 66 enters recess 64 in the bayonet arm. This prevents inadvertent removal of the bayonet arm from the clip should locking button 62 become disengaged from recess 74 since tab 66 in recess 64 will prevent withdrawal of the arm from the clip.

In another embodiment of the invention spring 54 can be bent, as illustrated in FIG. 6, so as to form a narrow protuberance 80 at approximately the position of the tab element 66 of the previously described embodiment. The remainder of spring 54 of this embodiment, including tab 56, remains the same so that the spring can be readily inserted into the clip body as described above. With this type of spring arrangement protuberance 80 is used in lieu of the tab 66 to enter recess 66 of the bayonet arm and provide the double latching function. And, the spring width dimension is selected to be such that it is smaller than the diameter or recess 64 to insure that the protuberance properly enters the recess.

A further embodiment of the present invention is illustrated in FIGS. 7 and 8 of the drawing wherein a connecting clip 100, similar to the clip 18 previously described, is shown. For convenience, elements of clip 100 that correspond to elements of clip 18 are identified by the same reference numerals.

In this embodiment of the invention an elongated spring 110 is provided having a bent section 112 formed therein. A tab 66 is formed at the apex of bend 112 in position to align with the recess 74 in the top wall 32 of the clip body when the spring is in its operating position. A second tab 56 is formed on the spring, as in the prior embodiments, in position to be inserted through the slot 42 of the spring support wall 50 so that the tab will prevent removal of the spring from the clip, i.e. it will prevent movement of the spring to the right in FIG. 7.

The end 58 of spring 110 is elongated in this embodiment of the invention and extends across the space between the flange members 22 of the clip extension 20. The latter has a front wall 114 which is engaged by the end 58 or spring 110 when the spring is in its operative position to prevent further movement of the spring to the left in FIG. 7. Wall 114 in the embodiment is used in place of, and functions as, the abutment wall 60 of the embodiment of FIG. 2.

When a bayonet windshield wiper arm 16 is inserted in the clip, the end of the arm engages tab 66 of the spring and pushes the spring down slightly as the bayonet arm moves into the clip. The pocket 39 defined in recess 34 in the clip is dimensioned to closely receive the arm and has a shoulder 116 formed on its bottom wall 40 which engages the free end 70 of arm 16 to limit penetration of the arm into the clip recess to the proper position wherein the locking button 62 of the arm enters and engages clip recess 74. At that same position the tab 66 of spring 110 enters the bottom recess 64 of the bayonet arm. Thus the spring tab provides a double locking effect since the inclined tab 66, engaged in arm recess 64, will also resist rearward movement of arm 16 out of the clip should the button 62 become disengaged from spring 74. However, as in the prior embodiment the button 62 is normally held in opening 74 because of the tight fit between pocket 39 and the free end of the bayonet arm. Thus, as seen in FIG. 8 the tab 66 enters recess 64 but the remainder of the spring at bend 112 is spaced from and does not engage or support the bayonet arm.

Accordingly, it will be appreciated that the connecting clip of the present invention is relatively simple in construction and simple to manufacture. The clip body is formed in a fairly simple molding or casting process, and the flat spring element is readily manually inserted into the clip body and automatically locked in place due to the construction and cooperation between the spring tab 56 and the elements of the clip body. The spring is firmly held in place without the need for complicated bend formations in the clip body or spring element, and the spring cannot be inadvertently removed from the body. The pocket 39 formed in the clip serves to positively lock and hold the bayonet arm in position in the clip body so that locking button 62 remains in opening 74. On the other hand, the spring provides a double latching effect to prevent inadvertent removal of the arm from the clip should button 62 become disengaged from opening 74. In order to remove the bayonet arm from the clip the rear portion 90 of the spring element is simply manually depressed to disengage tab 66 or bend 80 from the bayonet arm, thereby allowing the operator to bend the bayonet arm downwardly to disengage locking button 62 from the recess 74 and slide the arm out of the clip.

Although an illustrative embodiment of the present invention has been described herein with reference to the accompanying drawings, it is to be understood that various changes and modifications may be effected therein by one skilled in the art without departing from the scope or spirit of this invention.

What is claimed is:

1. A connector clip for connecting a bayonet type windshield wiper arm to the superstructure of a windshield wiper assembly, said clip comprising a clip body having a first end portion including means for connecting the clip body to a windshield wiper superstructure and a second end portion adapted to operatively engage the free end of a windshield wiper arm, said second end portion having a top wall and an axially extended recess formed therein below said top wall defining a pocket which is generally complementary to said free end of the windshield wiper arm, for receiving said free end of the windshield wiper arm therein; said clip body including a spring mounting wall located adjacent said recess extending generally perpendicular to the recess and having a slot formed therein, and a relatively flat leaf spring element mounted in said slot and including an integral centrally located resilient tab in said spring adapted to be inserted with said spring through said slot, said tab extending in a downward direction opposite to the direction of insertion of the spring and being positioned to engage said support wall after insertion of the spring to prevent removal of said spring from the clip body, said spring element being located along said recess for engagement with said bayonet arm to aid in holding said arm in the clip; and an abutment wall located in spaced relation to said support wall on the side thereof opposite said pocket for engaging the end of the spring inserted through said slot and preventing movement thereof beyond the abutment wall whereby the spring is captured in a relatively fixed position in the clip body.

2. The connector clip as defined in claim 1 wherein said bayonet arm has a top surface and an upstanding stud thereon and said top wall of the clip body has an opening therein for receiving said stud thereby to hold the arm in said clip.

3. The connector clip as defined in claim 2 wherein the bayonet arm has a lower surface and a recess formed therein below said stud, said spring having a tab formed thereon received in said arm recess when the arm is inserted in the clip to aid in holding the bayonet arm in the clip.

4. A connector clip for connecting a bayonet type windshield wiper arm to the superstructure of a windshield wiper assembly, said clip comprising a main body portion and an extension portion including means for securing the clip to a wiper assembly superstructure, said main body portion including an elongated sleeve extending from said extension portion to a free end and having a recess formed therein for receiving, through said free end, the free end of a bayonet arm, said sleeve including top, side and bottom walls surrounding said recess with said bottom wall being shorter than said top wall and being spaced from said free end of the sleeve, said recess defining a pocket which is generally complementary to the free end of a bayonet arm to closely fit on the arm; said clip also including a support wall extending generally perpendicularly from and below said bottom wall, said support wall having an elongated slot therein; and a relatively flat leaf spring having one end inserted through said slot and an integral resilient tab formed in said spring between the sides of the spring and inclined downwardly away from said one end of the spring whereby the spring and tab may be inserted through said slot but withdrawal of the spring from the clip body is prevented by engagement of said tab with said support wall, thereby to prevent removal of said spring from the clip body, said leaf spring extending below and beyond said bottom wall of the sleeve toward the free end of the sleeve adjacent said recess to engage a bayonet arm inserted therein and aid in holding the arm in the clip; said clip body including an abutment wall located in predetermined spaced relation to said support wall on the side thereof opposite said pocket and further from the end of the sleeve than said support wall, for engaging said one end of the spring to prevent movement thereof beyond the abutment wall whereby the spring is captured in a relatively fixed position in the clip body by said abutment wall and tab member.

5. The connector clip as defined in claim 4 wherein said leaf spring includes a second resilient tab member formed integrally therewith and inclined upwardly and towards said one end of the spring.

6. The connector clip as defined in claim 5 wherein the bayonet arm has a recess formed therein for receiving said second tab member whereby the inclination of the second tab member allows the bayonet arm to be inserted in said sleeve but prevents removal of the arm from the sleeve when the second tab member is received in the arm recess.

7. The connector clip as defined in claim 6 wherein the top wall of said sleeve has an opening formed therein and said bayonet arm has a top surface including a locking button received in said opening when said second tab member is received in the arm's recess.

8. A connector clip for connecting a bayonet type windshield wiper arm to the superstructure of a windshield wiper assembly, said bayonet arm having upper and lower surfaces including a locking button on its upper surface and a locking recess on its lower surface; said clip comprising a main body portion and an extension portion including means for securing the clip to a wiper assembly superstructure, said main body portion including an elongated sleeve extending from said extension portion to a free end and having a recess formed therein for receiving, through said free end, the free end of the bayonet arm, said sleeve including top, side and bottom walls surrounding said recess and defining a pocket generally complementary to the free end of the arm; said bottom wall being shorter than said top wall and being spaced from said free end of the sleeve whereby said recess is opened along its bottom side between said bottom wall and free end of the sleeve; a support wall extending generally perpendicularly from and below said bottom wall and having an elongated slot formed therein, and an abutment wall located in spaced parallel relation to said support wall on the side thereof opposite said recess but positioned further from the free end of said sleeve than said support wall; and a flat leaf spring having one end inserted through said slot to a position adjacent said abutment wall and including an integral resilient tab inclined downwardly away from said one end of the spring whereby the spring and tab can be inserted through said slot until movement of the spring is stopped by the abutment wall, said tab being located to be between the abutment wall and support wall when movement of the spring is stopped thereby to prevent withdrawal of the spring from the clip body by engagement of the tab with the support wall; said leaf spring extending below and beyond the bottom wall of the sleeve toward the free end of the sleeve adjacent the recess and including a second resilient tab formed integrally with said spring and inclined upwardly towards said one end of the spring located to enter the locking recess in the lower recess in the lower surface of the bayonet arm when said one end of the spring is positioned adjacent said abutment wall to prevent removal of the arm from the clip; with the inclination of the second tab allowing the bayonet arm to be inserted in said sleeve but preventing removal of the arm from the sleeve when the second tab member is received in the arm's locking recess; and the top wall of said sleeve having a peripherally closed opening formed therein for receiving the locking button on the bayonet arm.

* * * * *